June 6, 1967 D. S. GREY ET AL 3,323,417
TESTING APPARATUS FOR OPTICAL LENSES
Filed April 10, 1962 5 Sheets-Sheet 3

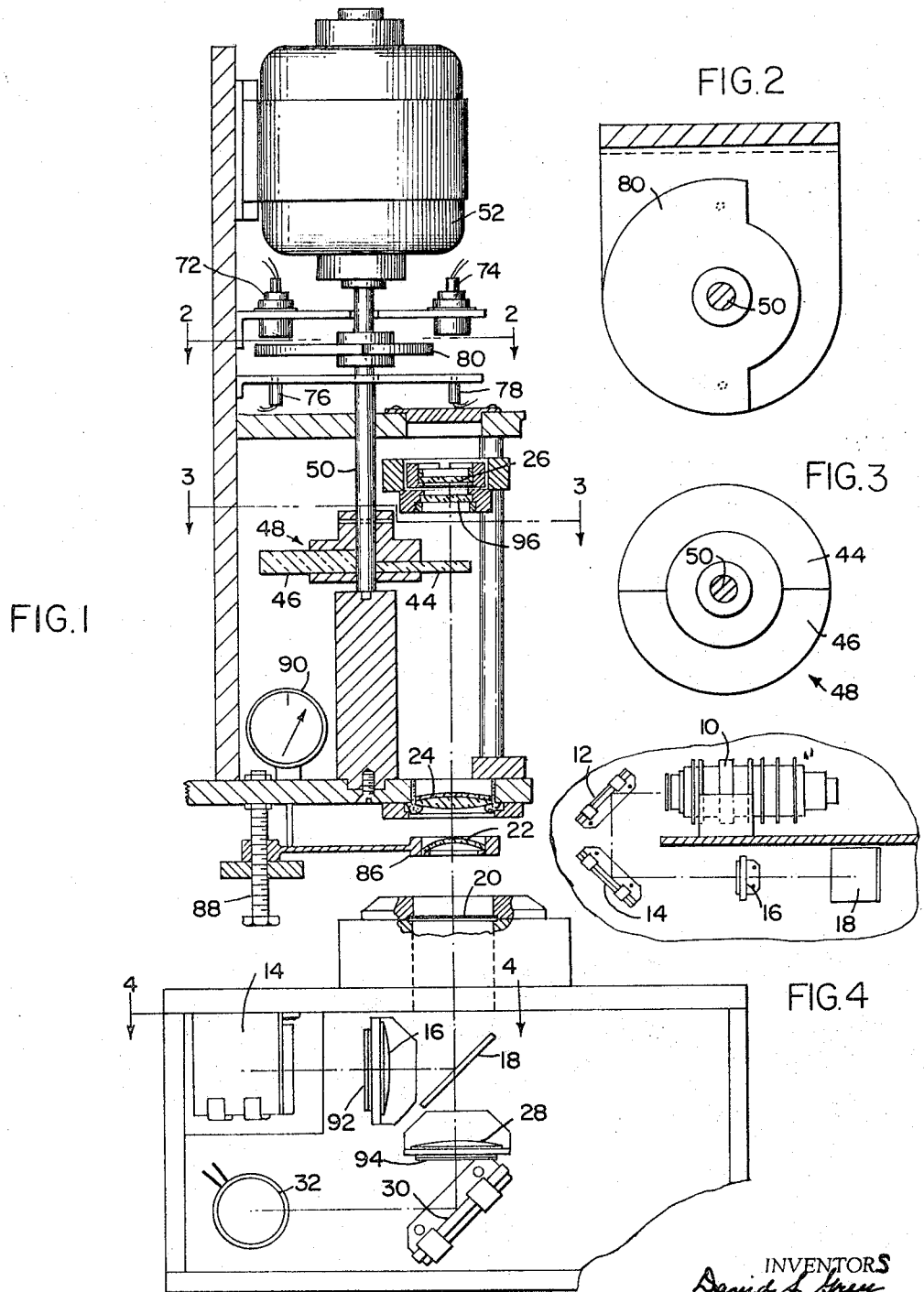

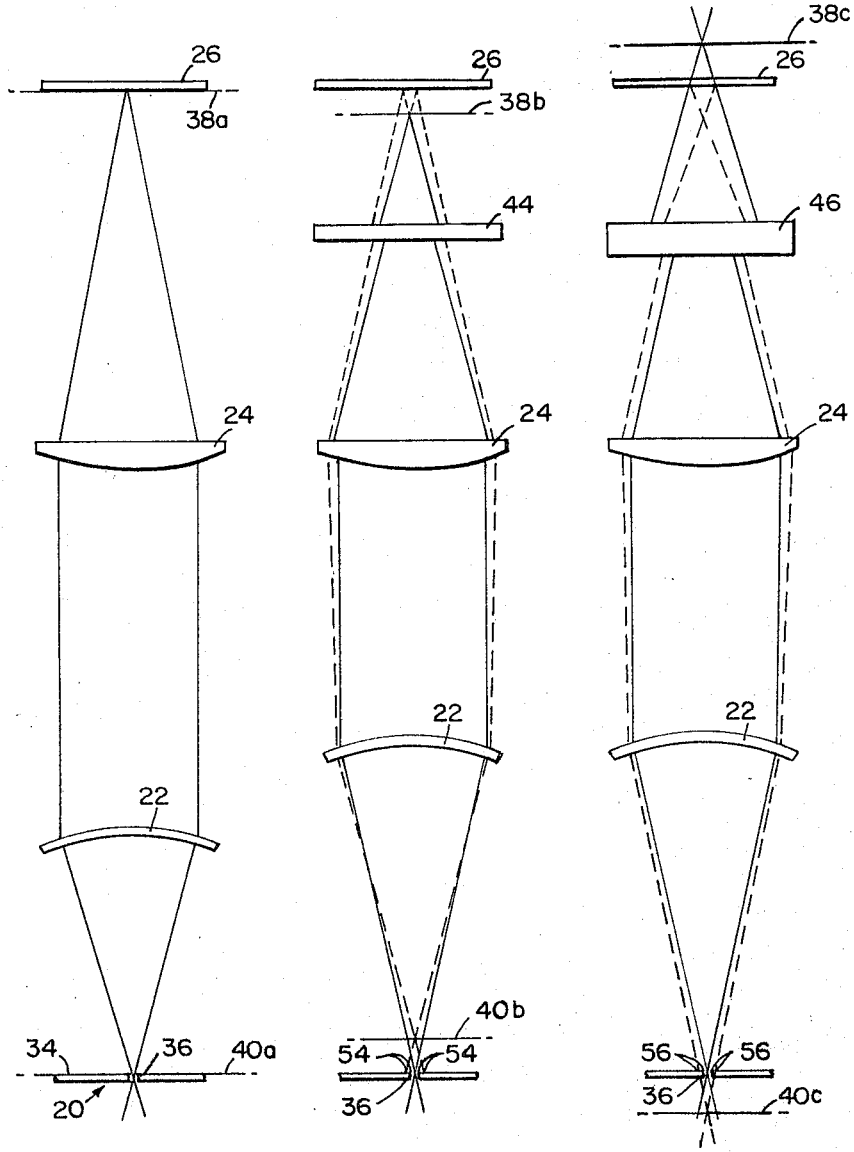

INVENTORS
Daniel S. Grey
Stanley H. Haskell
BY Brown and Mikulka
ATTORNEYS

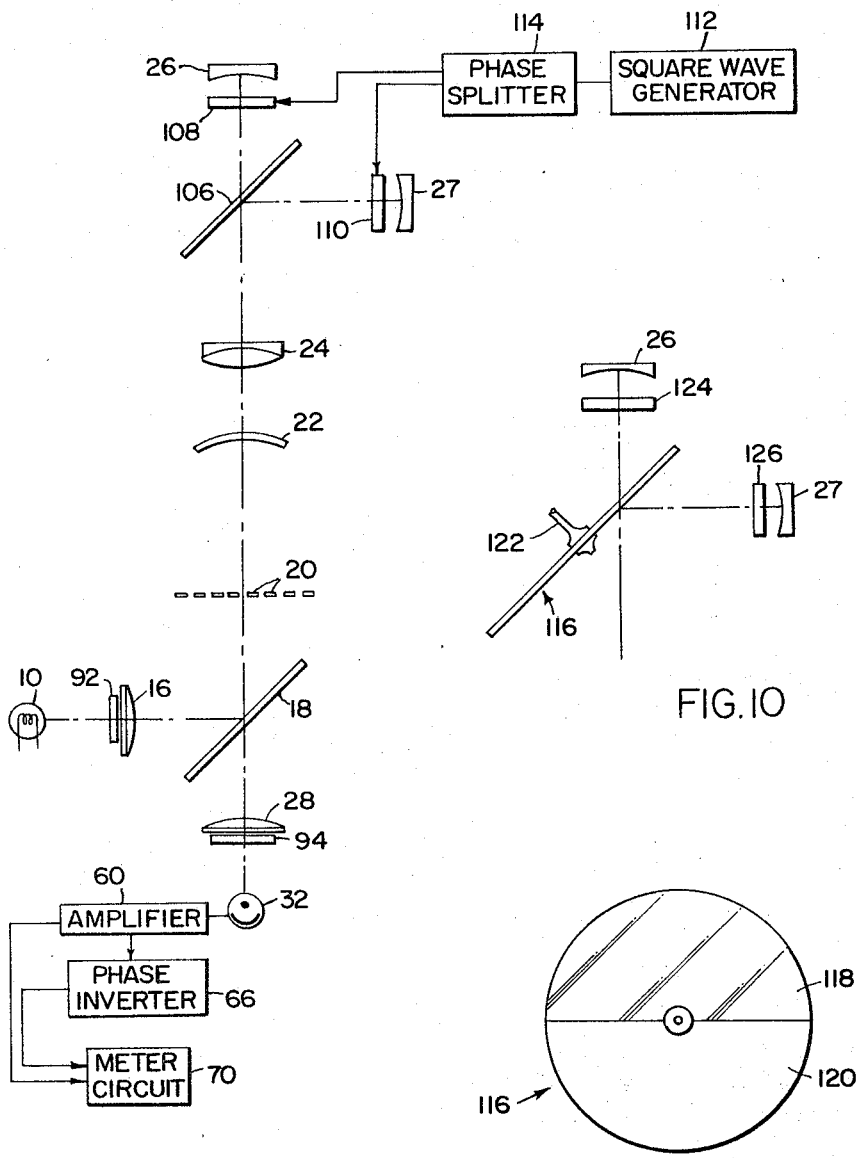

3,323,417
TESTING APPARATUS FOR OPTICAL LENSES
David S. Grey, Lexington, and Stanley W. Haskell, Cambridge, Mass., assignors to Polaroid Corporation, Cambridge, Mass., a corporation of Delaware
Filed Apr. 10, 1962, Ser. No. 186,443
1 Claim. (Cl. 88—56)

This invention relates to optical testing apparatus. More specifically, the invention relates to testing devices for determining the focal length of optical lenses or the amount of deviation from a specified focal length of a given lens.

In a well-known method for determining focal length of optical lenses, a light beam is passed through a reticle or object pattern, such as a grid, and the lens to be tested is used as a part of an optical system which focuses and reflects the image of the grid back through the grid to a photoresponsive cell. Electrical signals are generated in response to the amount of light reflected back through the grid, and these signals are at a maximum when the reflection of the grid image is focused on the grid. The lens being tested is initially set at a reference position with respect to a nominal focal length to focus the grid image at a given distance, for example, infinity, and is moved to alter the position of the plane of the focused image until the condition of the grid image being focused on itself is achieved. The linear deviation of the lens being tested from its initial position is then measured to determine the amount of deviation of the actual, or effective focal length of the lens from the nominal focal length.

Lenses which have a small aperture relative to their focal length have what is commonly termed a broad depth of focus. It is difficult to determine accurately the focal length of such lenses by the above-described method due to the fact that points on both sides of the actual focus point also appear to be in rather sharp focus. Therefore, if a light beam is passed through a grid and the image is focused and reflected back on itself through an optical system using a lens having a broad depth of focus, the signal generated in response to light returning through the grid will be at or near its maximum throughout a relatively large range of focusing movement of the lens. Consequently, it is difficult to establish the exact point at which the lens focuses the image of the grid exactly on itself.

It is an object of the present invention to provide apparatus for accurately determining the focal length of optical lenses, with special application to lenses having a broad depth of focus.

It is another object of the invention to provide novel apparatus for comparing the effective focal length of a given optical lens with a nominal focal length.

Further objects are: to provide novel apparatus comprising means for mounting a photographic camera thereon in order to compare, through elements of said apparatus, the focal length of the camera lens with a nominal focal length; to provide optical testing apparatus for determining the focal length of an optical lens by focusing an image of an object through the lens at a predetermined plane and causing said plane to move sequentially between at least two positions; to provide apparatus for determining the focal length of optical lenses wherein a beam of light is directed through an object pattern and an optical system, the path of said beam is sequentially varied by different amounts to cause sequential shifting of the plane of the object pattern image as focused by the optical system and the lens being tested is moved from an initial reference position to focus the image at predetermined planes; to provide apparatus for testing optical lenses wherein the image of an object pattern is reflected alternately by mirrors positioned at different distances from the object pattern to cause the image plane, as focused by an optical system including the lens being tested, to be focused alternately at different positions relative to the object pattern; and to provide optical testing apparatus wherein a beam of light is directed through an optical system and electrical signals generated in response to the position of an image plane focused by the optical system including means for eliminating unwanted signals due to internal reflections in the system.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claim.

For a fuller understanding of the nature and objects of the invention, reference should be had to the following detailed description taken in connection with the accompanying drawings wherein:

FIGURE 1 is a front view, partly in section and partly diagrammatic, of one embodiment of the present invention;

FIG. 2 is a plan view in horizontal section on the line 2—2 of FIGURE 1;

FIG. 3 is a sectional view on the line 3—3 of FIGURE 1;

FIG. 4 is a sectional view on the line 4—4 of FIGURE 1;

FIGS. 5a, 5b and 5c are diagrammatic illustrations of the optical paths of retrofocus systems associated with apparatus of the type illustrated in FIGURE 1;

FIG. 9 is a diagrammatic front view of the optical and electrical elements of another embodiment of the invention;

FIG. 10 is a diagrammatic fragment of a portion of FIG. 9 showing another embodiment thereof; and FIG. 11 is a plan view of one of the elements of FIG. 10.

Figure 8:
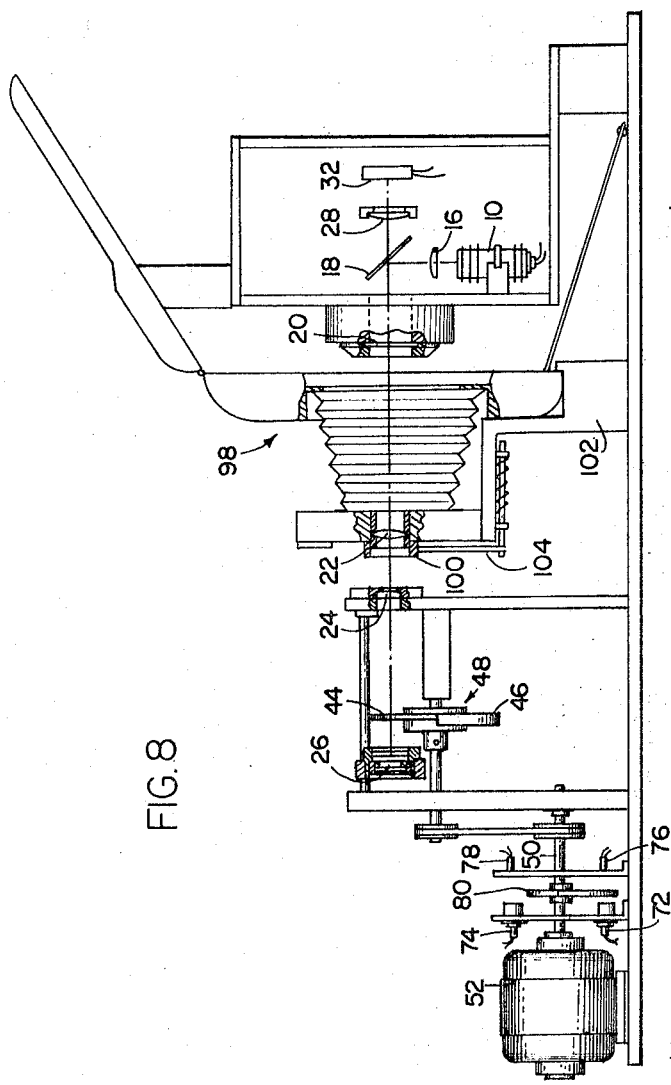
FIG. 8 is a side view, partly in section, of a device for carrying out additional applications of the present invention.

In the measurement of the focal length of optical lenses it is a common practice to pass a beam of light through a suitable object pattern for forming an image, such as a small aperture or slit in an opaque material, focusing the image by using the lens to be tested and reflecting the focused image back to the object pattern through the use of an autocollimator unit. Such units normally comprise a retrofocus lens and/or suitable reflecting surfaces for returning the image of the object pattern to a desired point without inversion or rotation. The object pattern most commonly used in such devices comprises a grid system having a plurality of slits or transparent areas in an otherwise opaque material. When the beam has been passed through the grid and returned by the autocollimator unit, a maximum amount of light passes back through the grid when the plane of the reflected image is in focus at the grid. It is possible to measure the intensity of light returning through the grid by the use of suitable means, such as a photoresponsive device which generates electrical signals which change in magnitude proportionately to the intensity of light incident on the device. Since lenses having a broad depth of focus may appear to be at their optimum focusing distance throughout a relatively large range of focusing movement, it is difficult to determine the exact position of the lens at which a maximum electrical signal is produced. In the embodiment of the present device illustrated in FIGURE 1, the beam of light is alternately refracted by different degrees after passing through the grid thereby producing a plurality of image planes separated from one another by a distance proportional to the difference in refraction. Electrical signals are generated in response to light received from each image plane. Through the use of suitable circuitry, which will be explained later, the signals generated in response to the intensity of light received from each image plane are alternately sampled and fed into an appropriate meter circuit which will register a null reading at the time that the signals from each image plane are exactly equal. This condition exists when the image planes are equally distant from and on opposite sides of the grid.

Referring now to the drawings, in FIGURE 1 is seen an optical device for determining the focal length of lenses according to the above-described method. A light beam is generated from illuminator 10 and reflected from mirrors 12 and 14, through lens 16 to mirror 18.

Although illuminator 10 may comprise any convenient light source, it is generally desirable to have a source of fairly high efficiency to make maximum use of the available light, an example being a microscope illuminator have a 25 watt lamp and a triple lens system for gathering the light. Mirror 18 is a "reflecting-transmitting" or semi-mirror having a light coating of a suitable material such as titanium dioxide, aluminum or silver so that a portion of the light incident thereon is reflected and substantially all of the remaining portion passes through the mirror. The portion of the beam from illuminator 10 which is reflected by mirror 18 passes through grid 20. The aperture of illuminator 10 is focused at grid 20 by lens 16. Grid 20 may comprise any well-known reticle means for forming an object pattern or image which may be focused at a desired point by the use of a suitable lens arrangement. A single slit or aperture in an opaque plate, an opaque pattern coated on a transparent surface, and a photographic negative of a reticle or grid-line system are some examples of suitable means for forming an object pattern, herein referred to for convenience as a grid.

Lens 22, the focal length of which is to be determined, lens 24 and mirror 26 comprise a retrofocus system designed to focus the image of the object pattern at a predetermined plane and reflect it without inversion or rotation to a reflected image plane. After being reflected back through grid 20, a portion of the light passes through mirror 18, through lens 28, and is reflected by mirror 30 to impinge upon a photo-responsive device, such as photomultiplier 32. Lens 28 is provided for focusing the image of grid 20 at a photomultiplier 32. The intensity of the light reaching photomultiplier 32 is determined by the amount of light which returns through grid 20. This amount of light in turn is determined by the position of the reflected image plane with respect to grid 20. For example, if the plane of the focused reflected image of grid 20 is coincident with the grid itself, substantially all the light which originally passed through will return. However, if the reflected image plane is displaced from the plane of grid 20, a lesser amount of light will return through the grid in proportion to the distance of the reflected image plane from grid 20. The position of the image plane of the reflected image of the object pattern may be controlled by movement of lens 22.

This condition is illustrated diagrammatically in FIG. 5a. Grid 20 in this case is illustrated for simplicity as comprising an opaque plate 34 having a single opening 36 therein. The image formed by light passing through opening 36 is focused by lens 22 at an image plane at a distance from lens 22 in proportion to the focal length of lens 22 and its distance from opening 36. If, for example, the distances from opening 36 to lens 22 is equal to the focal length of lens 22 then the image of the object pattern will be focused at infinity. After passing through lens 22 the image beam passes through lens 24 at which it is again focused at an image plane which is spaced from lens 24 by a distance equal to the focal length thereof, again assuming that the image beam received by lens 24 is focused by lens 22 at infinity. If the distance between lens 24 and mirror 26 is equal to the focal length of lens 24 then image plane 38a, the focused image of grid 20, will be coincident with the plane of mirror 26. The image is reflected by mirror 26 back through lenses 24 and 22 and image plane 40a, the reflection of image plane 38a, is coincident with the plane of grid 20. Therefore, a maximum amount of the light which originally passed through opening 36 returns therethrough after being focused by lenses 22 and 24 and reflected by mirror 26. This condition can also be achieved by moving lens 22 with respect to grid 20 if lens 24 is also moved a corresponding distance in proportion to its focal length with respect to mirror 26. However, if the distance between lens 24 and mirror 26 remains constant while lens 22 is moved with respect to grid 20, image plane 38a will be moved from its illustrated position as will image plane 40a, and the reflected image of opening 36 will no longer be in focus on itself. Thus, by a predetermined setting of the distance between lens 24 and mirror 26, the focal length of lens 22 may be calculated by determining when the intensity of light returning through opening 36 is at a maximum and at this time measuring the distance between lens 22 and grid 20. If the distance between lens 24 and mirror 26 is equal to the focal length of lens 24 then the distance from lens 22 to grid 20 will be the effective focal length of lens 22 at the time when the maximum amount of light returns through opening 36, as described above.

This well-known method of determining the focal length of optical lenses may be satisfactory for lenses having a relatively narrow depth of focus, i.e., those lenses whose effective aperture is relatively large in relation to their focal length. However, as has been previously mentioned, it is difficult to determine the exact point of focusing movement at which the maximum amount of light is returned through the grid for a lens having a broader depth of focus.

Figure 6:
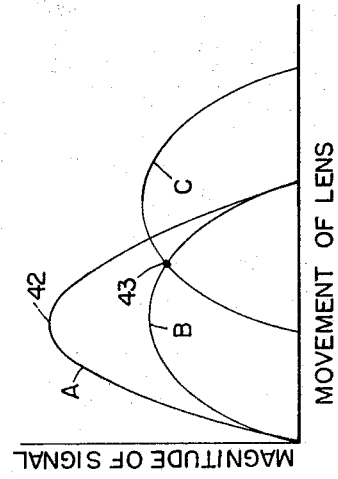
FIG. 6 is a graphical representation of the amplitude of electrical signals generated in response to light received from the imaging system of the device.

In FIG. 6, curves A, B and C represent the magnitude of electrical signals generated by a photoresponsive device in response to the amount of light returning through the grid in relation to focusing movement of the lens being tested. When the image of the grid is focused on itself the amount of light returning therethrough, and consequently the magnitude of the signal generated, is at a maximum represented by point 42. Curve A is characteristic of the type of curve associated with lenses having a narrow depth of focus while curves B and C are characteristic of the type associated with lenses having a broad depth of focus. Although the focal lengths of the lenses may be the same, the aperture of the lens of curve A would be larger than that of the lens of curve B or C. The depth of focus is normally defined in terms of a circle of confusion of given diameter which, for two lenses of the same focal length, would be farther away from the image focused by the lens having the smaller aperture of the two. For this reason the broad depth of focus lens has a flatter curve with the result that the maximum point on the curve is more difficult to determine. It should also be pointed out that the curve for any lens would tend to be flattened by anything tending to deteriorate the image-forming qualities of the lens, such as more severe aberrations, dirt on the lens, etc.

The prior art therefore provides means for testing the focal length of optical lenses wherein signals are generated in response to light passing through an object pattern, the magnitude of the signals being dependent upon the relative position of the object pattern and the plane of a focused image thereof. The object pattern is stationary and the position of the image plane may be adjusted by focusing movement of the lens being tested until the image plane is at a desired location as indicated by the signals. The focal length of the lens may then be calculated by measuring the distance from the object pattern to the lens or the amount of movement of the lens from an initial reference position. In the present invention the object pattern through which the light passes to produce a signal and the plane of a focused image corresponding in size and shape to the object pattern are sequentially displaced, or oscillated between two or more relative positions. Separate signals are generated sequentially in response to light received while the object pattern and image plane are in each relative position. If the object pattern and image plane are sequentially moved between two relative positions it is apparent that two signals will be intermittently generated for each focus position of the lens being tested. As the lens is moved, both relative positions change simultaneously and the magnitude of the two signals corresponding to focusing movement of the lens may be represented graphically as curves B and C. Whereas the position of focusing movement of the lens at which a maximum signal is generated on either curve is difficult to determine due to the flatness of the curve, the point at which the signals for each curve are equal is relatively easy to establish. This point, denoted by numeral 43, is illustrated in FIG. 6 as the point at which curves B and C cross. As the lens is moved in either direction from the position corresponding to point 43 the magnitudes of the two signals change in opposite directions, and a relatively small amount of focusing movement of the lens produces a readily apparent difference in the signals. Since the position or amount of movement from an initial reference position of the lens being tested can be accurately established when the signals are equal, thus relating a known lens position with a known relative position of object pattern and image plane, the focal length of the lens may be determined.

Sequential displacement or movement of the relative position of the object pattern and image plane may be effected in several ways one of which is sequential refraction of the beam in which the image of the object pattern is formed. For example, if the beam in FIG. 5a is refracted between lens 24 and mirror 26, the position of image plane 38a will be displaced by an amount proportional to the amount of refraction. In FIG. 5b a refracting element 44 is illustrated in the path of the beam and the position of image plane 38b is no longer coincident with the plane of mirror 26. As the beam is reflected it is again refracted by element 44 and the position of reflected image plane 40b is displaced a proportionate distance from the plane of grid 20. In FIG. 5c the same condition is illustrated with refracting element 46 which is of different refractive index than element 44. If element 46 has a higher index of refraction than element 44, reflected image plane 40c will be displaced farther from the plane of grid 20 than will image plane 40b, assuming lenses 22 and 24 remain stationary.

Referring again to FIGS. 1 and 3, refracting elements 44 and 46 are shown as forming separate parts of a circular disc 48. Disc 48 is mounted for rotational movement on shaft 50 which is driven by electric motor 52. As disc 48 is rotated, refracting elements 44 and 46 are sequentially moved in and out of the image beam between lens 24 and mirror 26 and alternate refraction of the image beam by different amounts takes place. Lens 22 is moved substantially along its optical axis until image plane 38b, associated with refracting element 44, is located on one side of mirror 26 and image plane 38c, associated with refracting element 46, is on the other side. For that portion of the rotation of disc 48 during which element 44 is in the optical path, reflected image plane 40b is positioned, for example, as in FIG. 5b. During this time, the amount of light returning through grid 20 is dependent upon the distance of image plane 40b from grid 20. From a comparison of FIGS. 5a and 5b, it will be seen that this amount of light is less than that which returns through grid 20 when image plane 40a is coincident therewith, since the reflected light in areas 54 does not return. As soon as element 44 is moved out of the optical path, element 46 is moved in and the position of the image plane is changed accordingly and, again, the light in areas 56 does not return through grid 20. If the reflected image plane associated with element 44 is displaced an equal distance from, and on the opposite side of, grid 20 from the reflected image plane associated with element 46, areas 54 will be substantially equal to areas 56. Consequently, the amount of light returning through grid 20 will be substantially equal for each image plane. It is again emphasized that this condition is achieved at only one position of focusing movement of lens 22.

The light returning through grid 20 is transmitted to photomultiplier 32 as previously described. As disc 48 is rotated, the electrical signals generated by photomultiplier 32 will be alternately in response to light received from image planes 40b and 40c.

Figure 7:
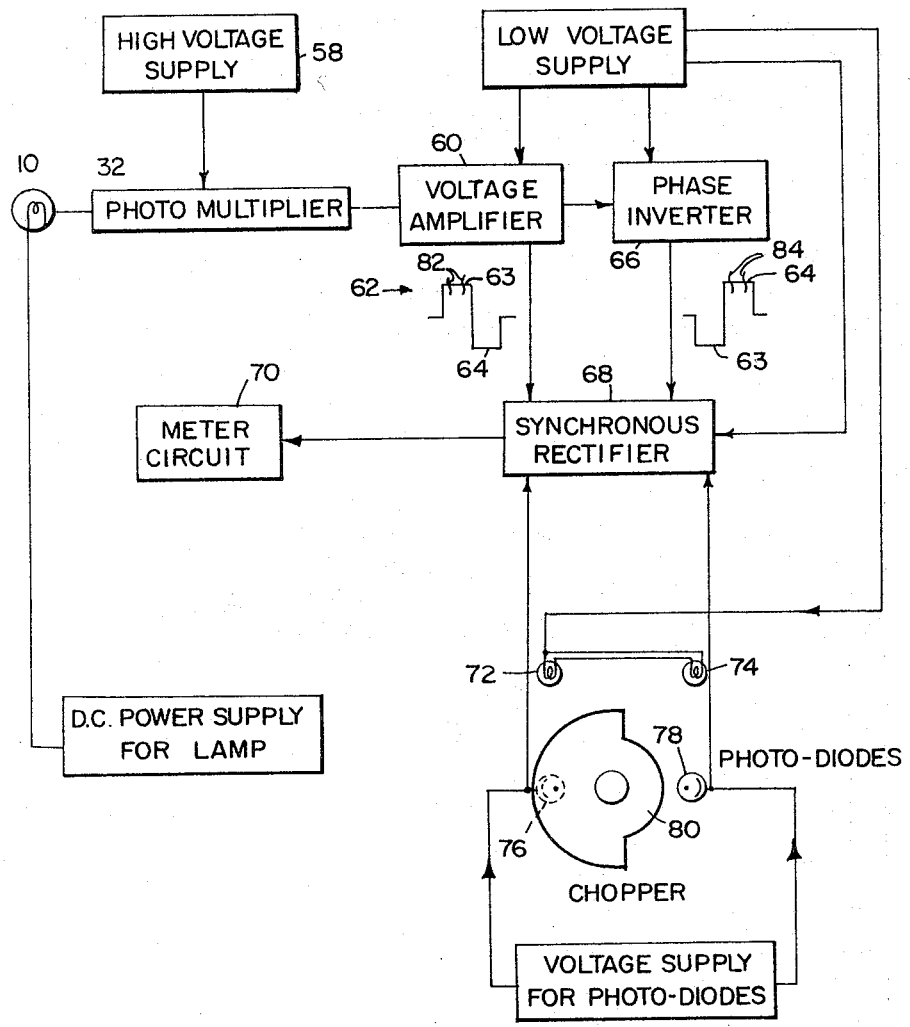
FIG. 7 is a block diagram representing a preferred embodiment of an electrical system of the device of FIGURE 1.

Referring now to the electrical block diagram shown in FIG. 7, a high-voltage supply 58 provides power for the operation of photo-multiplier 32. Light from illuminator 10 is transmitted to photomultiplier 32 through the optical system just described. Electrical signals are generated in response to the light received and are amplified by voltage amplifier 60. The alternate interruption of the optical path by elements 44 and 46 produces the effect of an alternating current signal being generated by photomultiplier 32. As these signals are amplified by voltage amplifier 60, they may be illustrated in the form of a square wave 62, seen below amplifier 60. One portion 63 of the signal will be produced by light received by photomultiplier 32 while element 44 is in the optical path, and the other portion 64 will be generated in response to light received while element 46 is in the optical path. After amplification, the signals are fed into both a phase inverter 66, in which the electrical sign of one of signals 63 and 64 is inverted, and a synchronous rectifier 68. After being electrically inverted, the signals are fed into rectifier 68 from inverter 66. Rectifier 68 therefore receives a continuous A.C. signal from amplifier 60 and a similar signal from inverter 66 with the signs reversed.

Portions of the signals received from amplifier 60 and inverter 66 are alternately passed from rectifier 68 to meter circuit 70 through the use of a synchronizing circuit. The synchronizing circuit comprises a pair of lamps 72 and 74 which are positioned to have light therefrom impinge upon photodiodes 76 and 78 respectively. Opaque chopper disc 80 is mounted for rotation on shaft 50 between lamps 72 and 74 and photodiodes 76 and 78. The shape of chopper disc 80, as best seen in FIG. 2, allows light from lamp 72 to impinge upon photodiode 76 for a predetermined portion of rotational movement of chopper disc 80 and prevents the light from impinging upon photodiode 76 for the remaining portion. The same is true with respect to lamp 74 and photodiode 78. Electric signals are generated by photodiodes 76 and 78 during that portion of rotational movement of chopper disc 80 that light is allowed to impinge upon the photodiodes. These signals are sent to synchronous rectifier 68 annd allow that portion of the signal being received at that time from amplifier 60 or inverter 66 to pass to meter circuit 70. For example, when a signal is received by rectifier 68 from photodiode 76, the signal being received at that time from amplifier 60 will be passed to meter circuit 70, and when a signal is received from photodiode 78 the signal being received at that time from inverter 66 is allowed to pass to meter circuit 70. Chopper disc 80 and disc 48 are relatively oriented on shaft 50 so that portions of signals reaching rectifier 68 in response to light received while element 44 is in the optical system are pasesd to meter circuit 70 alternately with signals received while element 46 is in the optical system. It may therefore be seen that that portion of the signal denoted by numeral 82 may be passed to meter circuit 70 alternately with that portion of the signal denoted by numeral 84. Since signal 82 is generated in response to light received from an image plane associated with one refracting element, and signal 84 in response to light associated with the other refracting element, meter circuit 70 will alternately receive signals associated with each image plane. It has been previously explained how the signals associated with each image plane, or when each refracting element is in the optical path, may be equal. If meter circuit 70 is of the type which registers only changes in the signals received, then a null reading will be registered at the time that signal 82 is equal to signal 84. This condition is achieved when image planes 40b and 40c are equally distant from and on opposite sides of grid 20, as previously explained.

Lens 22 is positioned with respect to grid 20 by appropriate holding means 86. Any appropriate means such as adjusting screw 88 is provided for effecting focusing movement of lens 22 within holding means 86, and means such as height gauge 90 are provided for registering changes in such movement. The zero position of height gauge 90 is set for a previously determined reference distance of lens 22 from grid 20. The focal length may be calculated for a lens which properly focuses the image of grid 20 at a given distance when spaced from grid 20 by a known distance. For example, if the known distance from grid 20 to lens 22 is 3″ and lens 22 focuses the image of grid 20 at infinity, as indicated by the position of the image plane, then the focal length of lens 22 is 3″. If lens 22 is positioned in holding means 86 at the zero position of height gauge 90 and meter circuit 70 registers a null reading, the focal length of lens 22 will be as previously calculated for the zero position of height gauge 90. If the null meter reading is not achieved, lens 22 is moved along its optical axis by adjustment of screw 88 until such reading is achieved. At this time the reading of height-gauge 90 will indicate the linear deviation of the actual or effective focal length of lens 22 from that previously calculated. As regards the above example, if height gauge 90 indicates that when the image of grid 20 is focused at infinity lens 22 has been moved .15″ away from grid 20 from its reference distance of 3″ then the effective focal length of lens 22 is 3.15″; if lens 22 is moved .15″ closer to grid 20, its effective focal length is 2.85″.

A variety of adjusting means may be provided for changing the position of holding means 86 and thus effecting focusing movement of lens 22. Many previously known mechanical arrangements may be used to permit manual adjustment, as well as automatic means operated, for example, by the signals generated by photomultiplier 32. One such automatic arrangement is a servo motor operatively connected to holding means 86 to cause focusing movement of lens 22 in one direction when the signals received from photomultiplier 32 are out of balance in one direction, and vice versa. Such arrangements have previously been used in automatic focusing devices and may be applied in like manner to the present invention.

It is possible in such an arrangement that residual reflections from the air-glass surfaces in the system, such as lenses 22 and 24 and grid 20, will result in a D.C. signal which tends to conceal the A.C. signal received from the reflected image planes. Also, reflections from disc 48 may result in an unwanted A.C. signal. In order to eliminate the undesirable signal, the beam may be extinguished through the use of crossed polarizers and only that portion which is reflected from mirror 26 to form the image planes may be depolarized as the axis of polarization may be rotated so that this light will not be extinguished. As seen in FIGURE 1, the beam is first polarized by polarizer 92 before entering the autocollimator unit and again by polarizer 94 before being reflected to photomultiplier 32.

The axes of polarization of polarizers 92 and 94 are crossed which would thus extinguish all light beyond polarizer 94. Phase changer 96 is positioned in the path of the beam just before it strikes mirror 26. The plane of polarization of a portion of the light is thereby rotated and/or depolarized at this point and is thus allowed to pass through polarizer 94 after being reflected back through grid 20.

The embodiment of the invention illustrated in FIG. 8 shows another application of the invention using apparatus modified only slightly from that shown in FIGURE 1. Light from illuminator 10 shines directly on mirror 18 and is reflected thereby through substantially the same optical system as shown in FIGURE 1. Photomultiplier 32 is positioned directly behind mirror 18 to receive light from the reflected image planes. Lens 22 in this case has already been installed in photographic camera 98 by conventional means, such as lens bezel 100. An appropriate stand or camera centering block 102 is provided for holding the camera so that lens 22 is a predetermined distance from grid 20 and in proper registration with the optical system. Additional holding means, such as spring-loaded clamp 104 which holds lens bezel 100 firmly in the desired position, may also be provided. As illustrated in FIG. 8, photographic camera 98 is of the type generally known as the Polaroid Land camera, as exemplified in U.S. Patents 2,435,717 and 2,455,111, but this application of the present invention is not intended to be restricted solely to cameras of this type. The camera may be positioned as shown either before or after the position of lens 22 with respect to the focal plane of camera 98 has been established. For example, the erecting system by which lens 22 is held at a given distance from the focal plane may be loose when camera 98 is positioned on stand 102. Lens 22 may then be moved with respect to grid 20, and with respect to the focal plane of camera 98, until it is properly distanced therefrom in accordance with its particular focal length. This condition will be indicated by readings on the meter circuit associated with photomultiplier 32 as previously described. When lens 22 has been properly positioned in this manner, the erecting system which holds lens 22 in a given position with respect to the focal plane of camera 98 may be tightened to fix this relationship. If the position of lens 22 with respect to the focal plane of camera 98 has already been fixed when the lens is tested, the device may be used in the nature of a go-no-go gauge; the meter readings will then be an indication of whether or not lens 22 is properly positioned in accordance with its particular effective focal length within the desired limits.

A further embodiment of the invention, wherein all moving parts may be eliminated, is shown in FIG. 9. In this embodiment the two image planes are created by the use of two separate mirrors 26 and 27, rather than a single mirror in combination with additional means for deviating the path of the light between the grid and the mirror. Elements of the embodiment of FIG. 9 which are common to the embodiment of FIGURE 1 are denoted by like reference numerals.

Light from illuminator 10 is directed through polarizer 92 and lens 16 and reflected by semi-mirror 18 through grid 20, lens 22 and lens 24. The light then strikes a second semi-mirror 106 and is partly reflected and partly transmitted thereby. The portion of the light which is transmitted by semi-mirror 106 then passes through phase changer 108 and is reflected by mirror 26 back through the retrofocus system. The portion of the light which is reflected by semi-mirror 106 passes through phase changer 110 and is reflected by mirror 27 back to semi-mirror 106 and again reflected thereby back through the retrofocus system. Mirrors 26 and 27 are spaced at different distances from semi-mirror 106 so that the images reflected back through the retrofocus system are focused in planes which are displaced from one another. Focusing movement of lens 22 will alter the position of the reflected image planes as in the embodiments of FIGURE 1.

After being reflected by mirrors 26 and 27 back through grid 20 a portion of the light passes through semi-mirror 18, lens 28 and polarizer 94 to impinge upon the light-sensitive device 32. The light is initially polarized by polarizer 92 and, and unless the plane of polarization is rotated, will be extinguished by polarizer 94 which is orientated with its plane of polarization at 90° to that of polarizer 92 as previously explained. Phase changers 108 and 110 comprise materials which rotate the plane of polarization of polarized light passing therethrough in response to actuation by electrical, magnetic, or mechanical means. For example, phase changers 108 and 110 may comprise Kerr cells which include a chemical such as nitrobenzene which is molecularly oriented in response to application of an electrical field to cause rotation of the plane of polarization of polarized light. As phase changers 108 and 110 are actuated, they will serve to depolarize the light which has been polarized by polarizer 92 and such light will therefore not be extinguished by polarizer 94.

In order to sequentially displace the position of the reflected image plane with respect to grid 20, phase changers 108 and 110 are alternately actuated so that light reflected by one of the mirrors 26 or 27 is depolarized so that it may pass through polarizer 94 and strike light-sensitive means 32, while light reflected by the other of the two mirrors is not depolarized and therefore is extinguished by polarizer 94 before reaching light-sensitive device 32. As a means for alternately actuating phase changers 108 and 110, there is provided means such as a square wave generator 112 which produces signals of equal amplitude on each cycle. In the case of an electrical field being used to actuate phase changers 108 and 110, electrical signals from square wave generator 112 may be sent into an electrical phase splitter 114, one of the outputs of which serves to actuate phase changer 108 and the other output to actuate phase changer 110. Thus phase changers 108 and 110 will be alternately actuated in response to signals from phase splitter 114 and will alternately depolarize light when a field is applied, and have no effect on the light when no field is applied.

Signals from light-sensitive device 32 are received by amplifier 60 and phase inverter 66, as in the embodiment of FIGURE 1 and as shown in the block diagram of FIG. 7. In the present embodiment, the signals may be sent directly to meter circuit 70 from amplifier 60 and phase inverter 66. There is no need to synchronize the signals from square wave generator 112 with signals which are supplied to meter circuit 70 and no need to sample portions of the signals from amplifier 60 and phase inverter 66 so synchronous rectifier 68 is not required in the present embodiment. This is due to the fact that the shift in position of the reflected image planes is substantially instantaneous as the electrical field or other actuating means is shifted from the phase changer 108 to phase changer 110. The condition of the unwanted signal arising when the position of the image plane is displaced by greater deviation of the beam, as by sequential movement of materials having different indices of refraction into the path of the beam or by movement of elements of the optical system, does not arise.

An additional embodiment would be the use of an element 116, seen in FIGS. 10 and 11, in place of semi-mirror 106 in the arrangement of FIG. 9. Element 116 comprises a disc having a segment 118, which is a fully reflecting surface, and segments 120 which is transparent or open. Element 116 would be arranged in the position of semi-mirror 106, with the reflecting surface of segment 118 facing mirror 27, and caused to rotate about an axis 122 through its center. As element 116 is rotated, light is alternately reflected to mirror 27 when segment 118 is in the optical path, and transmitted to mirror 26 when segment 120 is in the optical path. Phase changers 124 and 126 could then be similar to phase changer 96 of FIGURE 1 since element 116 alternately reflects light from mirror 27 while blocking light from mirror 26, and transmits light from mirror 26 while failing to reflect light from mirror 27, thus providing additional means for alternately displacing the position of the image plane with respect to grid 20.

The use of an element such as 116 would again necessitate synchronizing the signals to the meter circuit with the rotation of element 116. This could be accomplished as in the embodiment of FIGURE 1 by the use of additional lights and photodiodes for sending signals to a synchronous rectifier in response to light received as controlled by an appropriate rotating chopper disc. The circuitry could be essentially the same as shown in the block diagram of FIG. 7 with chopper disc 80 oriented with respect to element 116.

It is evident from the foregoing description that the present invention is not limited in scope to employment in devices such as those illustrated in the accompanying drawings. The actual characteristic measured in the illustrated embodiment is the relative displacement of the reflected image planes of the focused image of the grid from the plane of the grid itself. The displacement of the originally focused image planes from the plane of the mirror would be proportional to the displacement of the reflected image planes from the plane of the grid. Therefore, a measurement of the displacement of the originally focused image planes from the plane of the mirror would accomplish the same result. This could be done, for example, by replacing the mirror with a second grid, of like configuration and properly oriented with respect to the first grid, and measuring the intensity of light passing through the second grid. This would eliminate, of course, any reflection of the image of the grid.

It is also possible within the scope of the invention to eliminate the refracting elements since their function may be accomplished by a number of other known methods. The position of the focused image plane is longitudinally displaced or deviated by the use of the refracting elements which deviate the path of the beam. The beam could be deviated instead by mirrors, prisms, or the like, appropriately arranged in the path of the beam, to produce a similar longitudinal deviation in the position of the focused image plane.

Finally, it is to be noted that the deviation of the image planes with respect to the mirror and/or grid is a relative displacement and could be accomplished by sequential displacement of the plane of the mirror or grid with respect to a stationary image plane. For example, the device could be arranged as in FIGURE 1 except that disc 48 or any other beam-deviating means would be omitted, with the result that the image of grid 20 would be focused at a single, stationary plane in the vicinity of mirror 26. Known means could be provided for effecting sequential movement of mirror 26 along the optical axis of the system between positions on each side of the stationary image plane. The resulting reflected image planes would thus be sequentially displaced with respect to grid 20 with the same effect as in the illustrated device. Lens 24 could be sequentially moved in the same manner with like result. If the displacement of the image planes is effected by rotation of a disc to move refracting elements sequentially into and out of the path of the beam, the transition time in moving the position of the image plane will probably be shorter than if elements of the optical system are moved linearly back and forth. It may therefore be necessary to sample a smaller portion of the signals from the synchronous rectifier since it is not desirable to read the signal generated while the position of the image plane is changing, as previously explained. The portion of the signal sampled may be easily controlled by the shape of chopper disc 80 and its orientation with respect to photodiodes 76 and 78.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

Apparatus for testing the focal length of an image-forming optical system on an optical axis comprising, in combination:

(a) a light source and a stationary object pattern defining at least one opening through which a beam of light from said source is directed along said axis;

(b) reflecting means positioned in the path of said beam on the opposite side of said optical system from said pattern to reflect said beam back through said optical system along said axis, said optical system focusing an image of said object pattern at an image plane in the region of said object pattern and at a location determined by the focal length of said optical system and its distance from said object pattern;

(c) means for alternately varying the position of said image plane between first and second axial positions parallel to said object pattern;

(d) holding means for positioning said optical system on said axis in the path of said beam, said holding means including means for effecting movement of at least a portion of said optical system along said optical axis relative to said object pattern so as to effect a gross shift in both of said first and second positions of said image plane;

(e) photometric means positioned to receive said beam after it has been reflected back through said object pattern and to generate a first electrical signal the amplitude of which is related to the intensity of said beam when said image plane is in said first position, and a second electrical signal the amplitude of which is related to the intensity of said beam when said image plane is in said second position, the amplitudes of said signals being equal at a balance condition wherein said first and second positions are equidistant from a reference plane, the location of which reference plane is indicative of the focal length of said system; and (f) indicating means coupled to said photometric means and responsive to the amplitudes of said first and second signals for producing a unique indication when said balance condition has been established by adjustments of said holding means.

References Cited

UNITED STATES PATENTS

| | | | |
|---|---|---|---|
| 2,254,548 | 9/1941 | Ruhle et al. | 88—56 |
| 2,818,775 | 1/1958 | Ullrich | 88—56 |
| 2,838,600 | 6/1958 | Salinger | 250—234 X |
| 2,897,722 | 8/1959 | Gunter et al. | 88—56 |
| 3,100,239 | 8/1963 | Courtney-Pratt | 88—56 |
| 3,200,698 | 8/1965 | Froome et al. | 88—1 |
| 3,227,034 | 1/1966 | Shelton | 88—65 X |

FOREIGN PATENTS

| | | |
|---|---|---|
| 644,711 | 10/1950 | Great Britain. |

JEWELL H. PEDERSEN, *Primary Examiner.*

T. L. HUDSON, J. M. GUNTHER, O. B. CHEW, *Assistant Examiners.*